(12) United States Patent  
Kubota (10) Patent No.: US 7,661,714 B2
(45) Date of Patent: Feb. 16, 2010

(54) ALL TERRAIN VEHICLE (75) Inventor: Satoshi Kubota, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 409 days.

(21) Appl. No.: 11/336,495

(22) Filed: Jan. 20, 2006

(65) Prior Publication Data
US 2007/0170714 A1 Jul. 26, 2007

(51) Int. Cl.
B60P 3/22 (2006.01)
(52) U.S. Cl. .................. 280/834; 280/833; 280/835
(58) Field of Classification Search ........... 280/833, 280/834, 835
See application file for complete search history.

(56) References Cited

U.S. PATENT DOCUMENTS 6,264,241 B1 * 7/2001 Horiuchi .................. 280/781
6,435,233 B1 * 8/2002 Miura et al. ............... 141/390
6,651,764 B2 * 11/2003 Fournier et al. ........... 180/190
6,805,214 B2 10/2004 Maeda et al.
7,401,816 B2 * 7/2008 Abe et al. .................. 280/835
2002/0112907 A1 * 8/2002 Maeda et al. ............. 180/69.4
2005/0241867 A1 * 11/2005 Abe et al. .................. 180/182

* cited by examiner

Primary Examiner—Lesley D Morris
Assistant Examiner—Jacob Knutson
(74) Attorney, Agent, or Firm—Keating & Bennett, LLP (57) ABSTRACT A vehicle, such as an all terrain vehicle, includes a saddle type seat for the rider to sit on, and a fuel tank arranged below the seat. The fuel tank includes a fuel inlet positioned in front of the seat, in a traveling direction of the vehicle. The all terrain vehicle provides a comfortable ride to a rider by providing the fuel tank in the center of the vehicle, while mounting a fuel tank that is convenient to access.

4 Claims, 5 Drawing Sheets

ALL TERRAIN VEHICLE

BACKGROUND OF THE INVENTION

1. Field of the Invention

The present invention relates to a saddle type vehicle, such as an ATV (All Terrain Vehicle), for traveling on uneven ground such as wasteland, grassland, and swamps. Particularly, the present invention relates to a fuel tank provided in such a vehicle.

2. Description of the Related Art

In an all terrain vehicle, when traveling over uneven ground in fields such as for farming and hunting, or in sports racing, a fuel tank is arranged below a seat of the vehicle to travel more comfortably over the uneven ground (refer, for example, to U.S. Pat. No. 6,805,214). Conventionally, in the type of fuel tank arranged underneath a seat, a fuel inlet has been provided either below the seat, behind the seat, or to the left or right of the seat.

However, a vehicle including the fuel inlet provided at these positions, has drawbacks in convenience and comfort when traveling. For instance, when the fuel inlet is positioned below the seat, every time the rider refuels the seat must be removed, or at the very least opened and closed, and is therefore not very convenient.

When the fuel inlet is positioned either behind or to the left or right of the seat, it is necessary for the fuel tank to be extended further back than the seat, or to the left or right, and for the fuel inlet to be provided at this expanded port. Therefore, it is difficult to establish the center of gravity in the center of the vehicle, and it is difficult to obtain a comfortable ride. More specifically, if a fuel tank arranged underneath a seat is expanded to behind the seat, and a fuel inlet is provided in this widened portion, the center of gravity of the vehicle will be displaced to the rear. This will also occur when the fuel inlet is provided to either the left or right of the seat.

SUMMARY OF THE INVENTION

In order to overcome the problems described above, preferred embodiments of the present invention provide an all terrain vehicle that ensures a comfortable ride, while providing a convenient mounting for the fuel tank.

An all terrain vehicle according to a preferred embodiment of the present invention includes a saddle type seat for the rider to sit on, and a fuel tank arranged below the seat. The fuel tank includes a fuel inlet positioned in front of the seat, in a traveling direction, when viewed in plan.

In the present preferred embodiment, the fuel inlet is positioned in front of the seat. This means that at the time of refueling, the rider does not need to remove or open and close the seat, which is extremely convenient. And compared to the case where the fuel inlet is behind or to the left or right of the seat, the center of gravity of the fuel tank when filled with fuel is towards the center of the vehicle, which means that a more comfortable ride can be obtained.

According to another preferred embodiment of the present invention, an air cleaner for purifying air supplied to an engine is provided in front of the seat, in a traveling direction, when viewed in plan, and the fuel tank includes the fuel inlet further to the rear than the air cleaner.

In this preferred embodiment, since the fuel inlet is behind the air cleaner, the fuel supply operation is not hindered by the air cleaner, and convenience is improved.

According to another preferred embodiment of the present invention, a pair of left and right vehicle body frames extending in the front and rear direction of the vehicle is also provided. The fuel tank is arranged between the pair of left and right vehicle body frames. In this preferred embodiment, the fuel tank is protected by the vehicle body frames.

According to yet another preferred embodiment of the present invention, an upper wall of the fuel tank includes a front side upper wall portion extending forward and upward from the seat. The fuel inlet is provided in the front side of the front side upper wall portion. According to this preferred embodiment, the front side upper wall in which the fuel inlet extends frontward and upward. This means that the fuel inlet is positioned at a higher portion of the vehicle, and so it is easy to perform a refueling operation, and the convenience of the fuel tank is improved. Also, because the front side upper wall portion inclines upward, the capacity of the fuel tank is increased.

In a still further preferred embodiment of the present invention, an opening and closing cover capable of being opened and closed, for covering the fuel inlet, is further provided. Also, the opening and closing cover is preferably inclined diagonally upward, toward the front in a traveling direction of the vehicle when closing.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
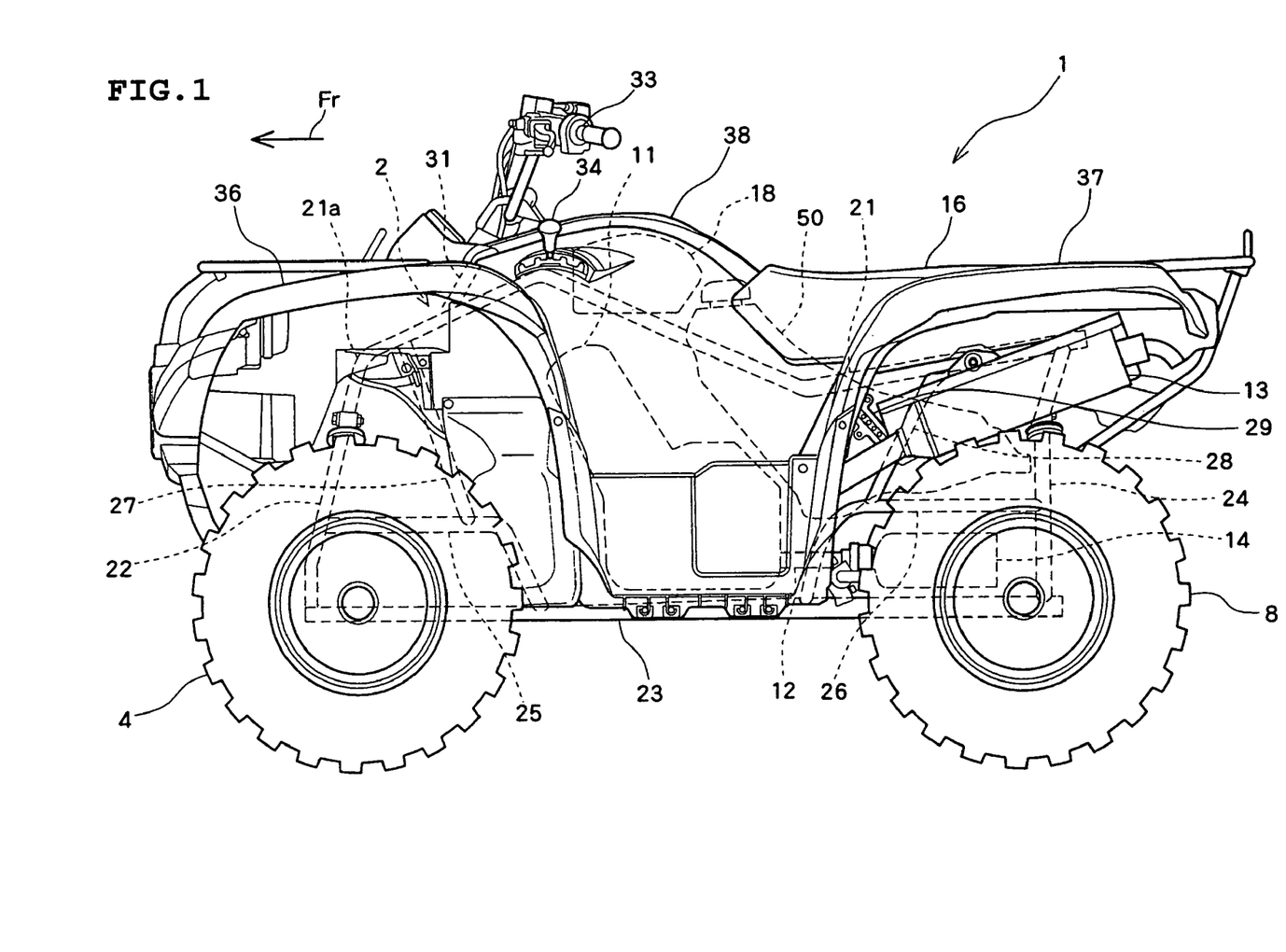
FIG. 1 is a side elevation of an all terrain vehicle according to a preferred embodiment of the present invention.
Figure 2:
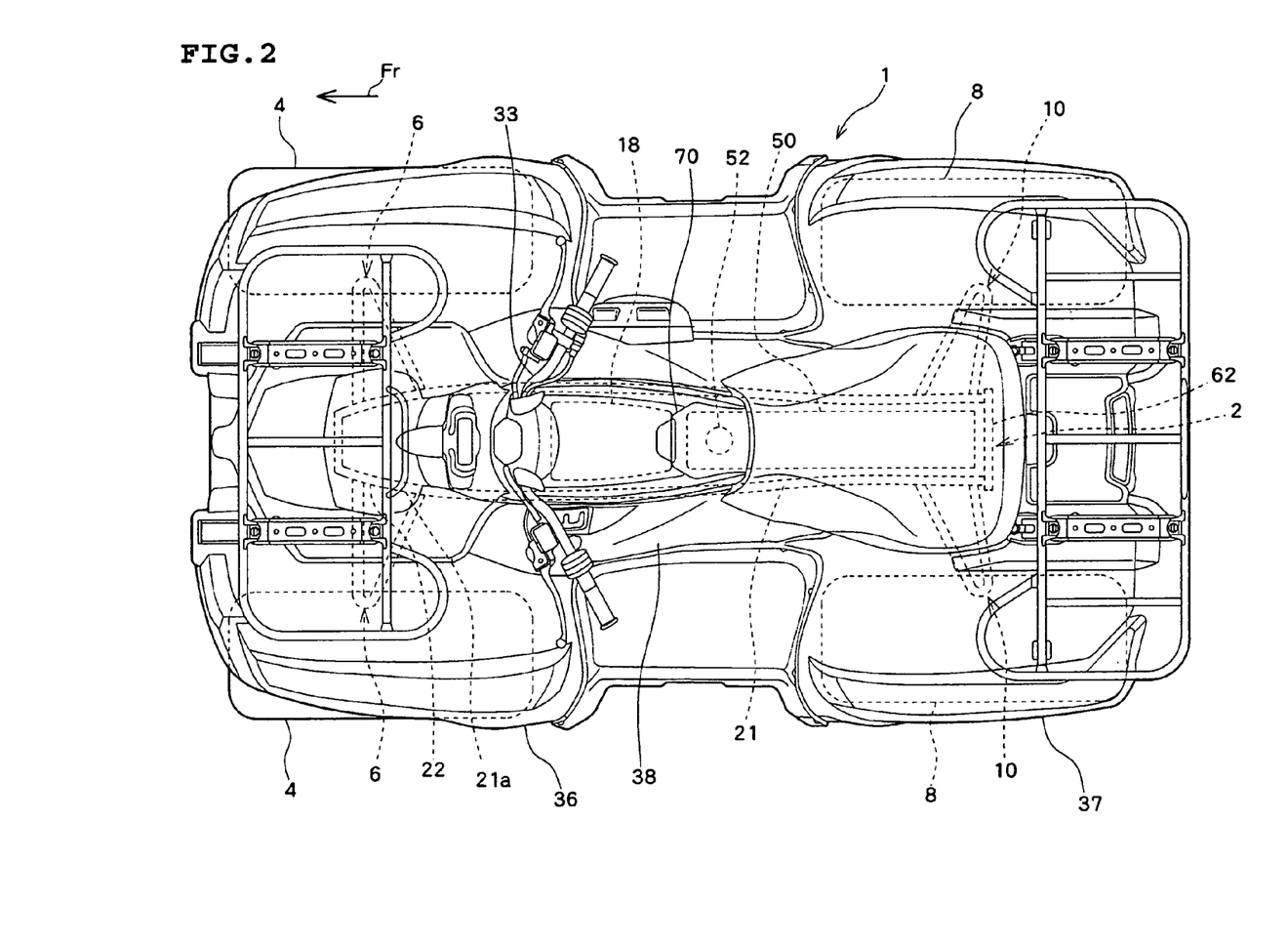
FIG. 2 is a plan view of the all terrain vehicle.

Preferred embodiments of an all terrain vehicle of the present invention will be described in the following with reference to the drawings. FIG. 1 is a left side elevation of an all terrain vehicle 1 of the present preferred embodiment, and FIG. 2 is a plan view of the all terrain vehicle 1.

The all terrain vehicle 1 is provided with a vehicle body frame 2 extending from a front portion of the vehicle towards the rear. An upper portion of the vehicle body frame 2 includes a pair of left and right upper pipes 21, 21 that extend in the front and rear direction of the vehicle. The upper pipes 21 curve diagonally downwards at a bent portion 21a provided at the front of the pipes. A front pipe portion 22 extending diagonally downwards is connected to the bent portion 21a. The lower portion of the vehicle body frame 2 includes left and right lower pipes 23, 23 extending in a front and rear direction. A rear pipe 24 extends from the rear end of the lower pipe 23 to a rear end portion of the upper pipe 21.

The vehicle body frame 2 is also provided with a pair of substantially L-shaped left and right front suspension arm support pipes 25, 25. Similarly, the frame is provided with a pair of substantially L-shaped left and right rear suspension arm support pipes 26, 26.

A front end of the front suspension arm support pipe 25 is connected to the front pipe portion 22, and a rear end of the front suspension arm support pipe 25 is connected to the lower pipe 23. A front end of the rear suspension arm support pipe 26 is connected to the lower pipe portion 23, and a rear end of the rear suspension arm support pipe 26 is connected to the rear pipe 24. A front reinforcement pipe 27 is fastened between the front suspension arm support pipe 25 and a portion slightly to the rear of the bent portion 21a of the upper pipe 21. A rear reinforcement pipe 28 is also fastened between the rear suspension support pipe 26 and a rear portion of the upper pipe 21. A reinforcement member 29 is fastened between a midway portion of the rear reinforcement pipe 28 and the upper pipe 21. A plurality of cross members are fastened between the pair of left and right vehicle body frames 2. These cross members will be described in detail later.

Front wheels 4, 4 are arranged to the left and right of a front lower portion of the vehicle. The left and right front wheels 4, 4 are supported by left and right front wheel suspensions 6, 6. The front wheel suspension 6 includes front side lower arms (not shown) and front side upper arms (not shown). The front side lower arm is connected to a front portion of the lower pipe 23 so as to be capable of moving up and down. The front side upper arm is connected to the front suspension arm support pipe 25 so as to be capable of moving up and down.

Rear wheels 8, 8 are arranged to the left and right of a rear lower portion of the vehicle. The left and right rear wheels 8, 8 are supported by left and right rear wheel suspensions 10, 10. The rear wheel suspension 10 includes rear side lower arms (not shown) and rear side upper arms (not shown). The rear lower arm is connected to a rear portion of the lower pipe 23 so as to be capable of moving up and down. The rear side upper arm is connected to the rear suspension arm support pipe 26 so as to be capable of moving up and down.

An engine unit 11 is arranged in a central portion of the vehicle. A front end of a rear wheel output shaft 12 is connected to the engine unit 11. A rear end of the rear wheel output shaft 12 is connected to a rear wheel differential reduction unit 14 arranged at a rear lower portion of the vehicle. The differential reduction unit 14 is connected to the rear wheels 8 via left and right rear wheel drive shafts (not shown) extending in the vehicle width direction. Drive force from the engine unit 11 is conveyed to the left and right rear wheels 8, 8 via the rear wheel output shaft 12, the differential reduction unit 14, and the rear wheel drive shafts. Exhaust gas emitted from the engine unit 11 is discharged to the rear (opposite direction to the direction shown by Fr in FIG. 1 and FIG. 2) from a muffler 13 arranged above the left rear wheel 8.

A fuel tank 50 is arranged diagonally upward and to the rear of the engine unit 11. A saddle type seat 16 for a passenger to sit astride is arranged above the fuel tank 50. An air cleaner 18 for purifying air supplied to the engine unit 11 is arranged above the engine unit 11 and in front of the fuel tank 50 in the traveling direction of the vehicle (the direction shown by Fr in FIG. 1 and FIG. 2). A steering shaft 31 extending diagonally downward is arranged in front of the air cleaner 18. A handle bar 33 for the rider to steer the vehicle is fixed to an upper end of the steering shaft 31. A gear shift lever 34 for a rider to change gears is arranged below the handlebar 33.

The all terrain vehicle 1 is provided with a front fender 36 arranged above and covering the left and right front wheels 4, 4, a rear fender 37 arranged above and covering the rear wheels 8, 8, and a cowling 38 covering a side front portion of the fuel tank 50 and the air cleaner 18. The vehicle body cover including the front fender 36, the rear fender 37, and the cowling 38, etc. functions as a mudguard.

Figure 3:
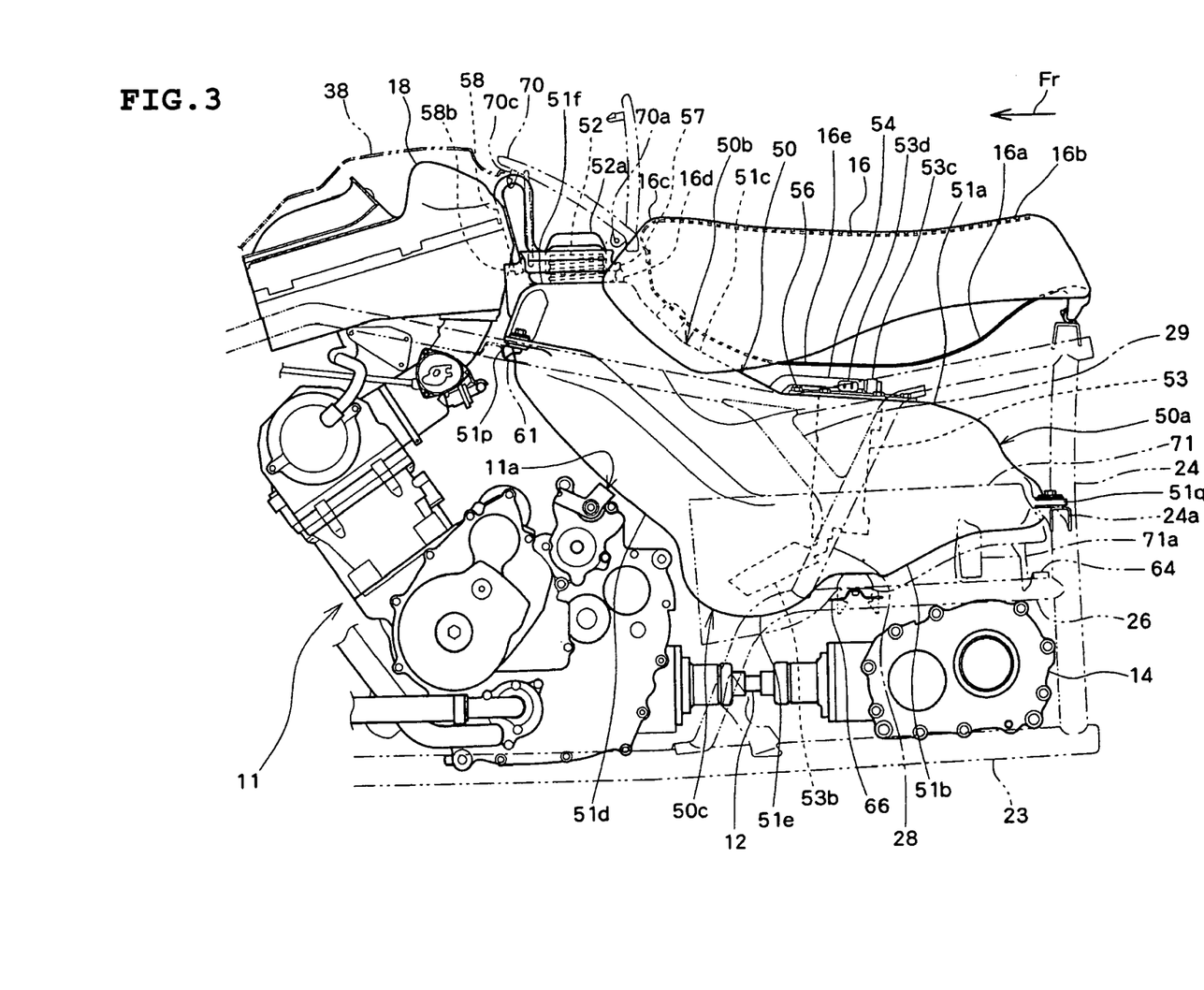
FIG. 3 is a side elevation of a rear portion of the all terrain vehicle showing a fuel tank, wherein a vehicle body frame is shown by chain two-dotted lines.
Figure 4:
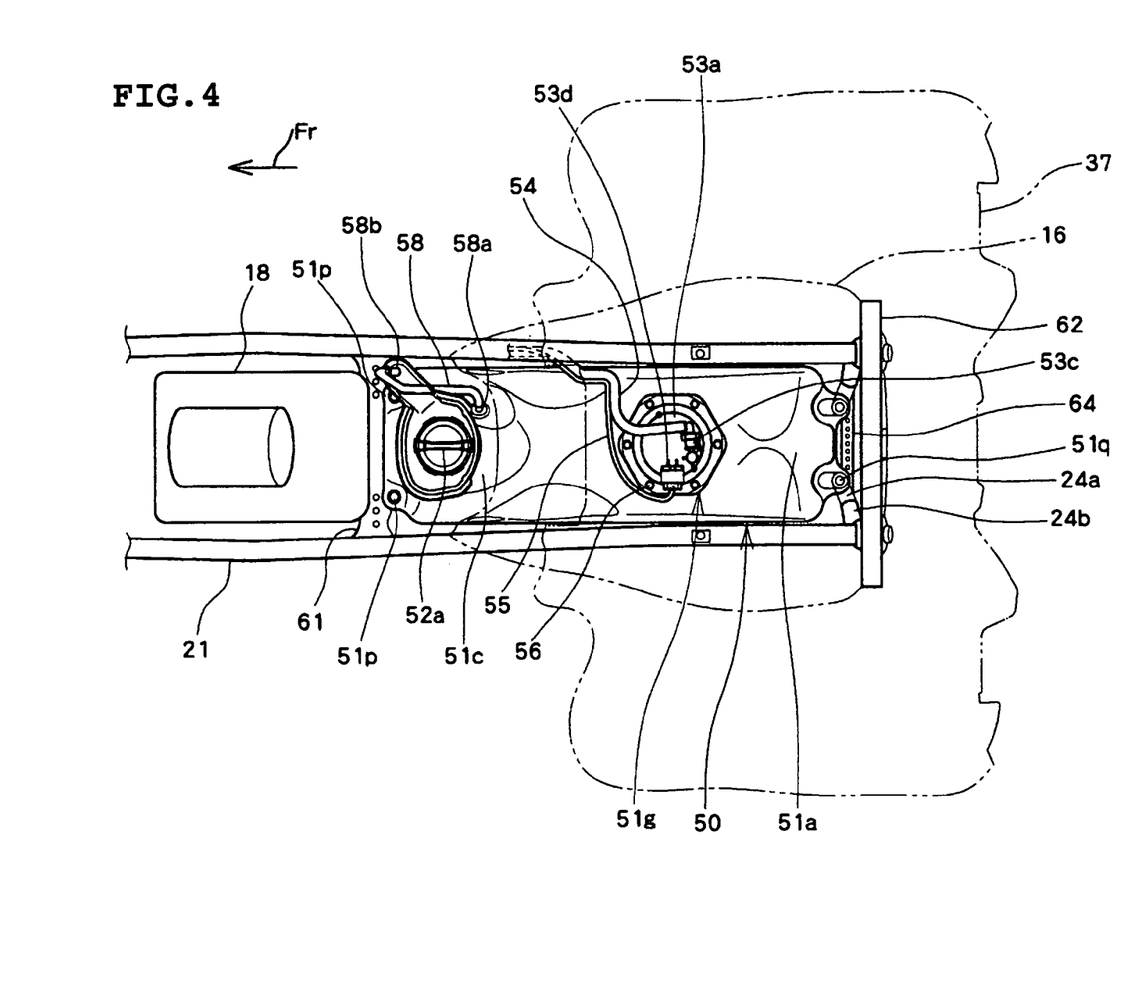
FIG. 4 is a plan view of a rear portion of the all terrain vehicle showing a fuel tank, wherein a rear fender and a seat is shown by chain two-dotted lines.
Figure 5:
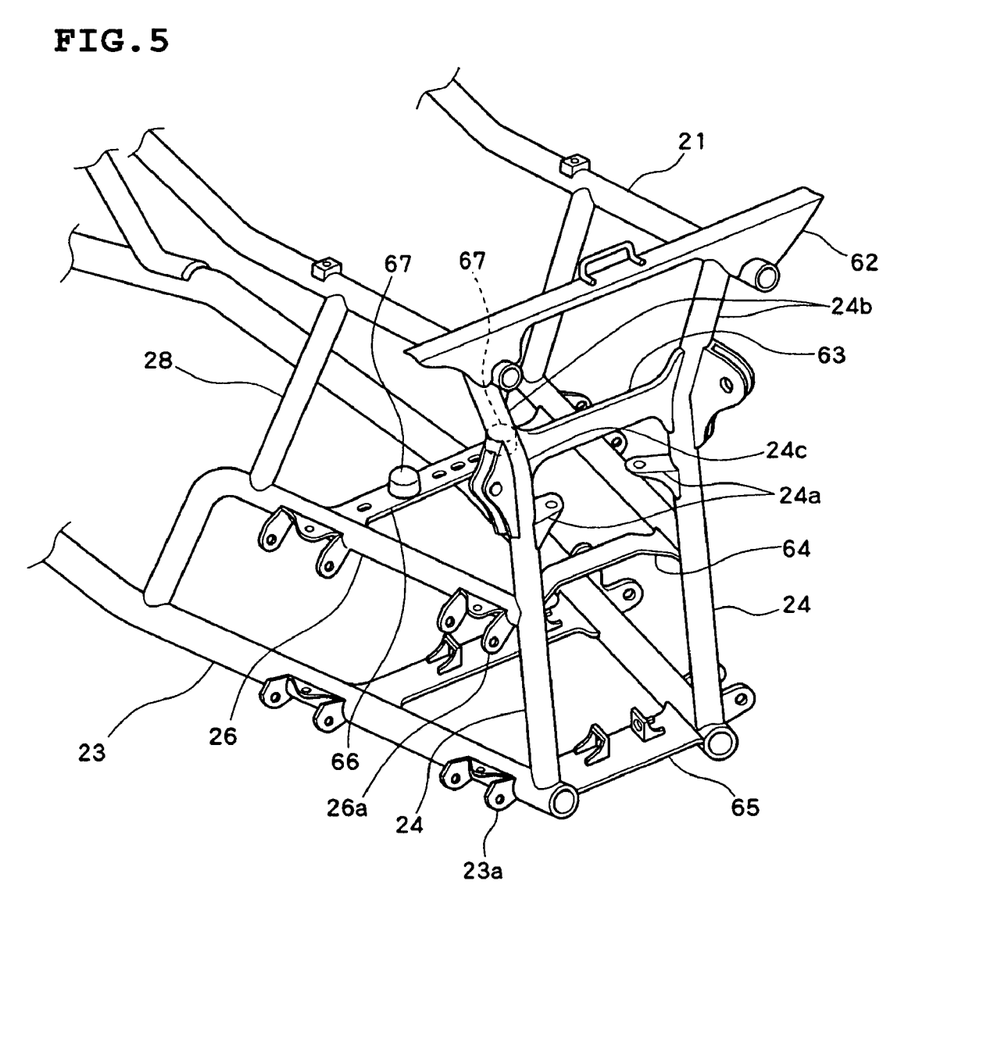
FIG. 5 is a perspective view facing to a rear portion of a vehicle body frame provided in the all terrain vehicle, as viewed from the rear.

The fuel tank 50 will now be described in detail. FIG. 3 is a side elevation of a rear portion of the all terrain vehicle 1 showing mainly a fuel tank 50, and FIG. 4 is a plan view of a rear portion of the all terrain vehicle 1 similarly showing mainly the fuel tank 50. FIG. 5 is a perspective view facing the rear portion of the vehicle body frame 2. In FIG. 3, description of the rear fender 37 and the cowling 38 is omitted, while in FIG. 4 the rear fender 37 and seat 16 are shown by chain double-dashed line and description of the cowling 38 is omitted.

The fuel tank 50 is preferably made of plastic. This fuel tank 50 is preferably substantially rectangular, when viewed in plan. The rear portion of the fuel tank 50 is preferably mostly flat and the front portion of the fuel tank is sloped upwards, when viewed from a side (refer to FIG. 3 and FIG. 4).

Specifically, as shown in FIG. 3, the rear portion 50a of the fuel tank 50 includes a rear upper wall portion 51a preferably provided in a generally flat manner, and a rear lower wall portion 51b that slopes downward from a rear end edge of the fuel tank 50. The front portion 50b of the fuel tank 50 includes a front upper wall portion 51c preferably inclined diagonally upward towards the front, and a front lower wall portion 51d similarly inclined upward towards the front. The front upper wall portion 51c extends generally from the rear upper wall portion 51a to the front. The fuel tank 50 has a base portion 50c at a lower portion in the middle of the tank. The base portion 50c includes a bottom wall portion 51e more deeply indented than the front lower wall portion 51d and the rear lower wall portion 51b. A small residual amount of fuel accumulates in this base portion 50c.

A fuel pump 53 is housed inside the fuel tank 50. A peripheral edge 53a of an upper surface of the fuel pump 53 is fixed by a fixing member 51g that has a ring shape configuration and fixed with a bolt 56 to a peripheral edge of an opening provided in the rear upper wall portion 51a. The fuel pump 53 includes a filter 53b at a lower portion of the pump. The filter 53b is arranged in the base portion 50c. Even if the residual amount of fuel becomes low and collects in the base portion 50c, the fuel pump 53 can suck up the fuel. A fuel hose 54, through which fuel sucked up by the fuel pump 53 flows, is connected to a hose connector 53c projecting upwards from the upper surface of the fuel pump 53. Wiring 55 for supplying electrical power to the fuel pump 53 is connected to a power supply connector 53d projecting upward from the upper surface of the fuel pump 53 (refer to FIG. 4). Incidentally, in FIG. 3, the wiring 55 for supplying electrical power to the fuel pump 53 is omitted.

As has been described above, the front upper wall portion 51c is inclined upward towards the front. A flat foremost wall portion 51f is provided in the center, in the vehicle width direction, of the front portion of the front upper wall portion 51c. A cylindrical fuel inlet 52 opening upwards is provided in this foremost wall portion 51f. In FIG. 3, a tank cap 52a for closing off the fuel inlet 52 is fitted to the fuel inlet 52.

A bowl shaped filler cover 57 that surrounds the periphery of the fuel inlet 52 is attached to the fuel inlet 52. A drain hose, not shown, that stretches as far as underneath the engine unit 11 is connected to a base of the filler cover 57. Fuel spilling out from the fuel inlet 52 because of excessive supply of fuel into the fuel tank 50 accumulates inside the filler cover 57, and is discharged below the engine unit 11 through the drain hose.

One end 58a of a pressure regulator hose 58 located at the left side of the fuel inlet 52 is connected to the front upper wall portion 51c. The other end 58b of the pressure regulator hose 58 is open to the atmosphere at an inner side of the filler cover 57. At the time of refueling, air accumulating inside the fuel tank 50 is discharged to the outside of the fuel tank 50 through the pressure regulator hose 58.

The fuel tank 50 includes the front end portion, the rear end portion and the central lower portion supported by the vehicle body frame 2. Specifically, left and right support portions 51p, 51p are provided at a front edge of the fuel tank 50. These support portions 51p, 51p are fixed with a bolt to a front support cross member 61 fastened between the left and right upper pipes 21, 21.

Rear support members 24a projecting towards the center in the vehicle width direction are attached to a mid-portion of the left and right rear pipes 24, 24 (refer to FIG. 5). Left and right support portions 51q, 51q are provided at the rear edge of the fuel tank 50. These support portions 51q, 51q are fixed with bolts to the rear support members 24a, 24a.

A tank support cross member 66 is also fastened between the mid-portion of the left and right rear suspension arm support pipes 26. Support members 67, 67 preferably made of elastic bodies (for example, rubber) for supporting the fuel tank 50 are fixed to the tank support cross member 66. A central lower portion of the fuel tank 50 is supported by the tank support cross member 66, due to the fact that the rear lower wall portion 51b is supported by these support members 67, 67 (refer to FIG. 3). In this way, the fuel tank 50 is supported by the front support cross member 61, the rear support members 24a, 24a, and the tank support cross member 66.

As shown in FIG. 5, the rear pipe 24 extends vertically from a lower end portion connected to the lower pipe 23, then bends slightly at the bent portion 24c, and includes inclined portions 24b inclined outwardly in the vehicle width direction.

Cross members 62, 63, and 65 are respectively fastened between end portions of the left and right upper pipes 21, 21 between mid-portions of the left and right rear pipes 24, 24 and between rear end portions of the left and right lower pipes 23, 23. A cross member 64 is fastened between rear end portions of the left and right rear suspension arm support pipes 26. Brackets 23a, 26a for connecting rear side lower arms (not shown) and rear side upper arms (not shown) of the above described rear wheel suspensions 10 are fixed to rear portions of the lower pipes 23 and the suspension support pipes 26.

As shown in FIG. 4, the fuel tank 50 is arranged between the pair of left and right vehicle body frames 2. More specifically, the front portion 50b of the fuel tank 50 is arranged between the left and right upper pipes 21, 21. The rear portion 50a is arranged between the left and right rear reinforcement pipes 28, 28 and between the left and right reinforcement members 29, 29 (refer to FIG. 3).

As shown in FIG. 3, the fuel tank 50 is arranged in a space enclosed by the engine unit 11, the differential reduction unit 14 and the seat 16. Specifically, as described above, the fuel tank 50 is arranged above a rear side of the engine unit 11, and the front lower wall portion 51d is inclined so as to extend along a rear side wall 11a of the engine unit 11. The rear portion 50a of the fuel tank 50 is positioned above the differential reduction unit 14 and below the seat 16, and the base portion 50c of the fuel tank 50 is positioned above the rear output shaft 12 that links the engine unit 11 and the differential reduction unit 14.

The rear upper wall portion 51a and the front upper wall portion 51c are positioned below the lower surface 16a of the seat 16. A front portion 16e of the lower surface 16a is inclined diagonally upwards towards the front in the traveling direction, and the front upper wall portion 51c is inclined so as to extend along the lower surface 16a.

The fuel inlet 52 provided in the foremost wall portion 51f is in front of the front end edge 16c of the upper surface 16b of the seat 16, and is positioned behind the air cleaner 18, when viewed in plan (refer to FIG. 4). An upright portion 16d is provided in the front portion of the lower surface 16a of the seat 16. The fuel inlet 52 of the fuel tank 50 is provided in front of this upright portion 16d when viewed from a side (refer to FIG. 3). Also, an upper edge of the fuel inlet 52 and the upper surface of the tank cap 52a are located at the position lower than the front edge of the upper surface 16b.

As shown in FIG. 2 and FIG. 3, the opening and closing cover 70 is arranged above the fuel inlet 52. The opening and closing cover 70 is at the front of the front edge 16c of the upper surface 16b of the seat 16. The opening and closing cover 70 opens and closes around a shaft 70a extending in the vehicle width direction provided behind the tank cap 52a, and in the opened state the tank cap 52a is exposed.

An engagement portion 70c projecting from a lower surface of the front portion of the cover 70 engages with the cowling 38, and therefore, the opening and closing cover 70 is closed securely. In the closed state, the opening and closing cover 70 is inclined diagonally upward towards the front, and the angle of this inclination is almost the same as the angle of inclination of the cowling 38.

A shield cover 71 for shielding heat given off from the muffler 13 and functioning as a mudguard is arranged to the side of the rear portion 50a of the fuel tank 50. This shield cover 71 is attached to the cross member 64 and the tank support cross member 66, which is fastened between the left and right rear suspension arm support pipes 26. A tip portion of a leg portion 71a provided on the shield cover 71 contacts with the rear suspension arm support pipes 26. In this way, the shield cover 71 is fixed to the vehicle body frame 2.

In the above described vehicle 1, the fuel inlet 52 provided on the fuel tank 50 is provided in front of the seat 16, which means that there is no need to remove or open and close the seat 16 at the time of refueling, which improves convenience. Also, since no need arises for widening the fuel tank 50 to the rear or left and right of the vehicle in order to provide the fuel inlet 52, it is easy to position the center of gravity of the fuel tank 50 at the center of the vehicle. Therefore, a more comfortable ride results when traveling.

The upper pipes 21, rear reinforcement pipe 28 and reinforcement member 29 of the vehicle body frame 2 are arranged to the left and right of the fuel tank 50, and these components protect the fuel tank 50. Since the front upper wall portion 51c of the fuel tank 50 is inclined diagonally upward towards the front, the capacity of the fuel tank 50 is increased.

The present invention is not limited to the above-described preferred embodiments, but can be modified within the scope of the attached claims. Further, the technologies disclosed in above-described preferred embodiments can be used in combination, as desired.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A vehicle comprising:
a saddle seat for a rider to sit astride;

a fuel tank arranged below the seat, the fuel tank including a fuel inlet; and an air cleaner arranged to purify air to be supplied to an engine; wherein the fuel inlet is positioned in front of the seat in a traveling direction of the vehicle;

the air cleaner is provided in front of the fuel inlet;

the fuel inlet is located between a top and a bottom of the air cleaner along a height dimension of the vehicle;

both the air cleaner and the fuel inlet are arranged directly above the engine; and at least a portion of the fuel tank is arranged between the fuel inlet and the engine along the height dimension of the vehicle.

2. The vehicle of claim 1, further comprising a pair of left and right vehicle body frames extending in a front to rear direction of the vehicle, and the fuel tank is arranged between the pair of left and right vehicle body frames.

3. The vehicle of claim 1, wherein an upper wall of the fuel tank includes a front upper wall portion extending forward and upward from below the seat, and the fuel inlet is provided in a front portion of the front upper wall portion.

4. The vehicle of claim 1, further comprising a cover arranged to cover the fuel inlet and capable of being opened and closed, the cover being inclined diagonally upward and forward in a traveling direction of the vehicle.

* * * * *

UNITED STATES PATENT AND TRADEMARK OFFICE
CERTIFICATE OF CORRECTION

PATENT NO.       : 7,661,714 B2                                       Page 1 of 1
APPLICATION NO. : 11/336495
DATED            : February 16, 2010
INVENTOR(S)      : Satoshi Kubota It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Thirtieth Day of November, 2010

David J. Kappos
*Director of the United States Patent and Trademark Office*